(12) United States Patent
Okada et al.

(10) Patent No.: US 8,037,582 B2
(45) Date of Patent: Oct. 18, 2011

(54) FASTENER

(75) Inventors: Shigeo Okada, Kanagawa (JP); Kouichi Kato, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 575 days.

(21) Appl. No.: 12/213,965

(22) Filed: Jun. 26, 2008

(65) Prior Publication Data

US 2009/0000085 A1 Jan. 1, 2009

(30) Foreign Application Priority Data

Jun. 29, 2007 (JP) .................. P2007-172236

(51) Int. Cl.
*F16B 19/10* (2006.01)
(52) U.S. Cl. .................................... 24/297; 24/453
(58) Field of Classification Search ............ 24/110, 24/297, 453, 606, 607; 411/347.7, 508–510; 403/322.1
See application file for complete search history.

(56) References Cited

U.S. PATENT DOCUMENTS

| | | | | |
|---|---|---|---|---|
| 1,563,350 | A | * | 12/1925 | Field et al. ............. 24/110 |
| 6,616,479 | B1 | | 9/2003 | Jones |
| 2003/0171030 | A1 | | 9/2003 | Jones |
| 2007/0099452 | A1 | | 5/2007 | Okada et al. |

FOREIGN PATENT DOCUMENTS

| | | |
|---|---|---|
| CN | 2561990(Y) | 7/2003 |
| DE | 4211072 A1 * | 1/1993 |
| JP | 63-068505 (U) | 5/1988 |
| JP | 2-1525 | 1/1990 |
| JP | 11-93924 (A) | 4/1999 |
| JP | 2007-56895 | 3/2007 |

OTHER PUBLICATIONS

Japanese Office Action dated Dec. 14, 2010 with English translation.
Chinese Office Action dated May 20, 2011 with English-language translation thereof.

* cited by examiner

*Primary Examiner* — James Brittain
(74) *Attorney, Agent, or Firm* — McGinn IP Law Group PLLC

(57) ABSTRACT

According to an aspect of the present invention, there is provided a fastener including: a fastener body including: a cylindrical portion having an insertion hole formed therethrough; and a locking portion protruding outward from the cylindrical portion; and an unlocking member inserted into the insertion hole, wherein the locking portion is inserted into an attachment hole of an attachment object from a front side thereof, and exposed from a rear side of the attachment hole, wherein the locking portion has an elastic claw locked to an edge of the attachment hole at the rear side, wherein the elastic claw is elastically reducible in diameter, wherein the unlocking member is movable in a position rearward of the elastic claw, and wherein the locking portion is reduced in diameter when the unlocking member is pushed.

11 Claims, 6 Drawing Sheets

FASTENER

CROSS-REFERENCE TO RELATED APPLICATIONS

This application claims priority from Japanese Patent Application No. 2007-172236 filed on Jun. 29, 2007, the entire contents of which are incorporated herein by reference.

BACKGROUND OF THE INVENTION

1. Field of the Invention

An aspect of the present invention relates to a fastener used, for example, to fix plate-like members such as exterior or interior components of vehicles to a vehicle panel.

2. Description of the Related Art

Generally, fasteners fastening a plate-like member to a panel of a vehicle have a free detaching function, for example, so as to separate the plate-like member at the time of a breakdown of an electric sun-roof. Such a kind of fastener is disclosed, for example, in JP-UM-H02-001525-B.

The fastener disclosed in JP-UM-H02-001525-B is described in brief. The numbers in the brackets are reference numerals in JP-UM-H02-001525-B. The fastener (10) in JP-UM-H02-001525-B is completed by inserting an operation member (30) into an inner cylindrical portion (13) of a main body (11). By pressing and inserting an outer cylindrical portion (16) into an attachment hole (41), a locking claw (18) is locked and the fastener (10) is locked to the attachment hole (41) by single step. When detaching the fastener (10) from the attachment hole (41), a contact protrusion (20) of the main body (11) comes in slidable contact with a tapered portion (39) of the operation member (30) and moves inward, by pressing down the operation member (30). With the movement of the contact protrusion (20), an elastic portion (17) and a locking claw (18) are drawn inward. Accordingly, the locking claw (18) can be unlocked from the attachment hole (41).

However, in the fastener described in JP-UM-H02-001525-B, the contact protrusion (20) is formed in an L-shaped plate (19). Accordingly, when the operation member (30) is pressed and thus the contact protrusion (20) is made to move inward, the L-shaped plate (19) is bent. As a result, the drawing force due to the inward movement of the contact protrusion (20) is not directly transmitted to the elastic portion (17) and the locking claw (18), whereby the locking to the attachment hole (41) may not be surely released.

In the locked state of the fastener, the outer cylindrical portion (16) is deeply inserted into the attachment hole (41) and is exposed from the opposite side of a panel (40). When the locking to the attachment hole (41) is released, the diameter of the elastic portion (17) is made to be reduced by the tapered portion (39) formed in the inner middle portion of the operation member (30). Accordingly, the operation member (30) has to be pressed deeper. Therefore, an enough space between the vehicle panel and the panel (40) for inserting the operation member (30) is required to layout the fastener, thereby deteriorating the layout property.

SUMMARY OF THE INVENTION

An object of the invention is to provide a fastener that has an excellent layout property and can reliably unlock a locking portion from an attachment hole by directly transmitting an external force to the locking portion locked to the attachment hole with a pressing operation of an unlocking member inserted into the fastener attachable and detachable by single step.

According to an aspect of the present invention, there is provided a fastener including: a fastener body that includes: a cylindrical portion that has an insertion hole formed to penetrate therethrough from one end face to the other end face thereof; and a locking portion that protrudes outward from the other end face of the cylindrical portion; and an unlocking member that is inserted into the insertion hole, wherein the locking portion is formed to be inserted into an attachment hole of an attachment object from a front side, and to be exposed from the attachment hole from a rear side, wherein the locking portion has an elastic claw that is locked to an edge of the attachment hole at the rear side, wherein the elastic claw is elastically reducible in diameter, wherein the unlocking member is movable in a position rearward of the elastic claw in a direction from the one end face to the other end face of the cylindrical portion, and wherein the locking portion is reduced in diameter when the unlocking member is pushed.

According to such a configuration, the elastic claw is elastically reduced in diameter with an external force. Accordingly, the fastener can be reliably unlocked from the attachment hole by applying the external force directly to the elastic claw with the pressing operation of the unlocking member.

The unlocking member is movable forward and backward in the back of the elastic claw and does not move to the end more than the elastic claw. Accordingly, by using the fastener according to the invention, it is enough if only a space corresponding to the insertion width for the locking portion is provided in the front space into which the locking portion is inserted, thereby improving the layout property of the fastener.

The locking portion may include an extension part that is continuously formed with the elastic claw. The unlocking member may include a pressing portion. The pressing portion may be brought into contact with the extension part when the unlocking member is pushed. The elastic claw may be reduced in diameter through a contact between the pressing portion and the extension part.

According to such a configuration, since the extension part of the elastic claw engages with the pressing portion of the unlocking member, the extension part is reliably pressed by the pressing portion at the time of the pressing operation of the unlocking member. Accordingly, the pressing operation of the unlocking member can directly reduce the diameter of the elastic claw.

The elastic claw may push back the unlocking member by being released from a diameter-reduced state when a pressing operation onto the unlocking member is released.

According to such a configuration, the unlocking member moves backward with the urging force by only releasing the pressing operation of unlocking member. Accordingly, the fastener has an excellent general-use property, because it can be reused without additional operation.

The pressing portion may be formed at a distal end of the unlocking member. The extension part may be formed at a distal end of the elastic claw.

According to such a configuration, since the extension part extending forward continuously from the elastic claw engages with the pressing portion disposed at the end of the unlocking member, it is possible to reduce the movement distance of the unlocking member, thereby further reduce the size of the fastener.

The elastic claw and the extension part may form a cantilever piece, a root of the elastic claw being a base portion thereof, an end of the extension part being a free end thereof. The pressing portion may include a slope that is formed to reduce in diameter of the distal end of the extension part when the unlocking member is pushed.

According to such a configuration, since the extension part formed in the form of a cantilever piece comes in contact with the pressing portion of the unlocking member at the rear end thereof and the pressing portion guides the extension part of the elastic claw along the slope in the diameter-reducing direction, it is possible to simplify the structure for directly reducing the diameter of the elastic claw at the time of the pressing operation of the unlocking member.

The unlocking member may include: a head portion; a pair of wall portions that extends from the head portion so as to be faced with each other; a connection portion that connects ends of the pair of wall portions; a pressing portion that is formed on the connection portion; and a drop-preventing claw that is formed on the pair of wall portions. In the insertion hole, a drop-preventing step may be formed to be engaged with the drop-preventing claw and to prevent the unlocking member from dropping from the insertion hole.

According to such a configuration, the unlocking member having both the bendable side portion and the strong pressing portion can be formed simply. By allowing the drop-preventing claw and the drop-preventing end to engage with each other, it is possible to prevent the unlocking member from dropping from the insertion hole. Since the unlocking member includes the drop-preventing claw but the pair of walls is bent to reduce the diameter of the drop-preventing claw inwardly at the time of inserting the unlocking member into the insertion hole, it is possible to easily insert the unlocking member into the insertion hole.

The drop-preventing claw may include an elastic piece that protrudes from side edges of the pair of wall portions.

According to such a configuration, the unlocking member is more easily bent due to the elastic piece protruding from the edges of the pair of walls and thus the unlocking member is more easily inserted.

The unlocking member may include a positioning protrusion that is formed on the pair of wall portions. On an inner wall of the insertion hole, a positioning guide groove may be formed to slidably guide the positioning protrusion in an axis direction of the insertion hole.

According to such a configuration, since the positioning protrusion of the unlocking member is guided to the positioning guide groove formed in the insertion hole, it is possible to prevent the deviation in rotational position of the unlocking member at the time of the pressing operation of the unlocking member. Since the deviation in rotational position is prevented, it is possible to reliably transmit the pressing force of the unlocking member to the elastic claw.

On the inner wall of the insertion hole, a rib may be formed to extend in an axis direction of the insertion hole. The unlocking member may include a support portion that protrudes from the connection portion. The support portion and the elastic claw may be formed to be slidable in the axis direction with the rib interposed therebetween.

According to such a configuration, since the rib in the insertion hole is interposed between the support portion formed in the unlocking member and the outer edge of the elastic piece, it is possible to prevent the deviation in rotational position of the unlocking member at the time of the pressing operation of the unlocking member. Since the deviation in rotational position is prevented, it is possible to reliably transmit the pressing force of the unlocking member to the elastic claw.

The head portion may include a flange. In the insertion hole, a stopper may be formed to regulate a moving range of the unlocking member inside the insertion hole by contacting with the flange.

According to such a configuration, the forward movement of the unlocking member is regulated by the flange and the stopper. As a result, it is possible to prevent an excess load from acting on the elastic claw with the pressing operation of the unlocking member, thereby improving the durability of the fastener.

BRIEF DESCRIPTION OF THE DRAWINGS

These and other objects and advantages of this invention will become more fully apparent from the following detailed description taken with the accompanying drawings in which:

FIG. 2A is a side view, FIG. 2B is an enlarged side view of part X of FIG. 2A, and FIG. 2C is an enlarged top view of part X of FIG. 2A;

FIG. 3A is a side view, FIG. 3B is a top view, and FIG. 3C is an enlarged perspective view as viewed in direction Y of FIG. 3A;

FIG. 4A is a view as viewed from the front side, FIG. 4B is a side view, FIG. 4C is a top view, FIG. 4D is a cross-sectional view taken along line A-A of FIG. 4B, and FIG. 4E is a cross-sectional view taken along line B-B of FIG. 4B;

FIG. 5A is a side view and FIG. 5B is a top view.

DETAILED DESCRIPTION OF THE EMBODIMENTS

Hereinafter, embodiments of the invention will be described in detail with reference to the accompanying drawings.

Figure 1:
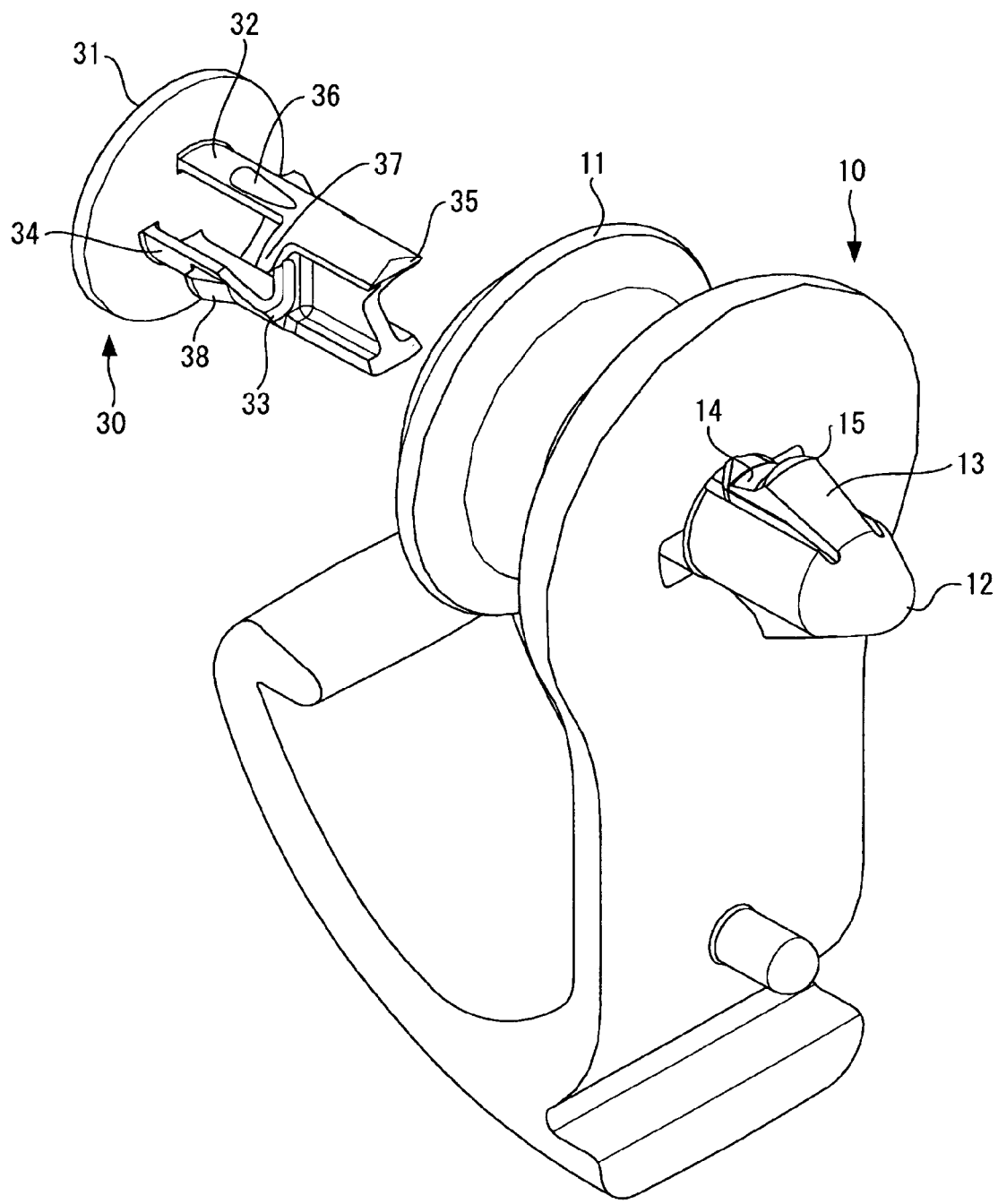
FIG. 1 is a perspective view illustrating an entire configuration of a fastener according to an embodiment.

FIGS. 1 to 6D are diagrams illustrating a configuration of a fastener according to an embodiment of the present invention. FIG. 1 is a perspective view illustrating the entire configuration of the fastener.

As shown in FIG. 1, the fastener is assembled from two components a fastener body 10 and an unlocking member 30, which are formed by an injection molding method. The fastener is used to fix a plate-like member to a panel 100 of a vehicle as described above.

Figure 2A:
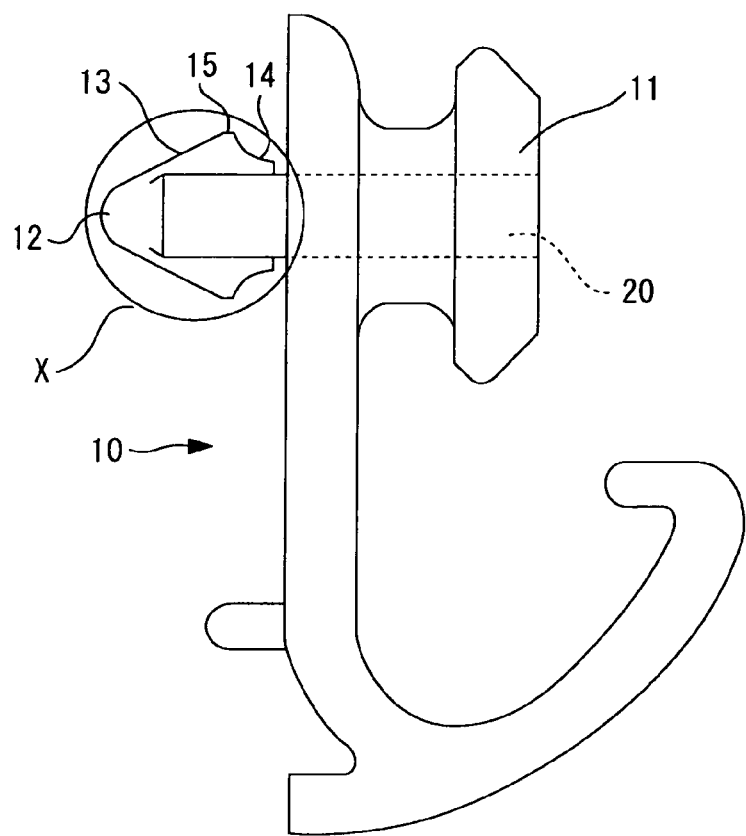
FIGS. 2A to 2C are development views illustrating a fastener body of the fastener, where
Figure 2B:
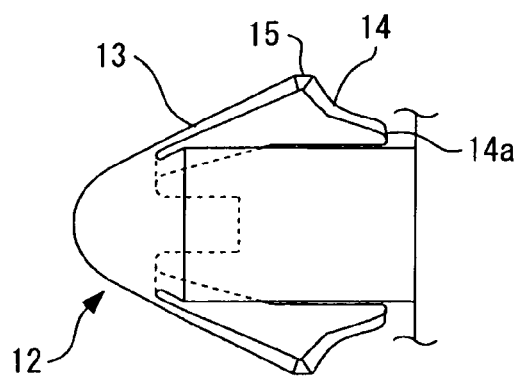
Figure 2C:
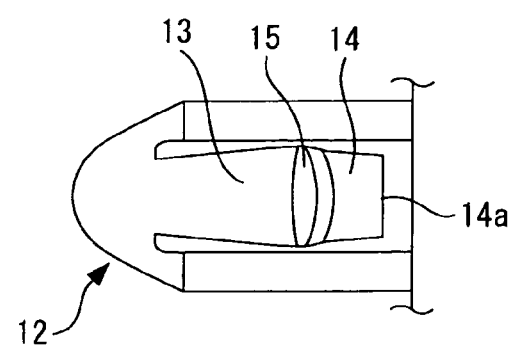
Figure 3A:
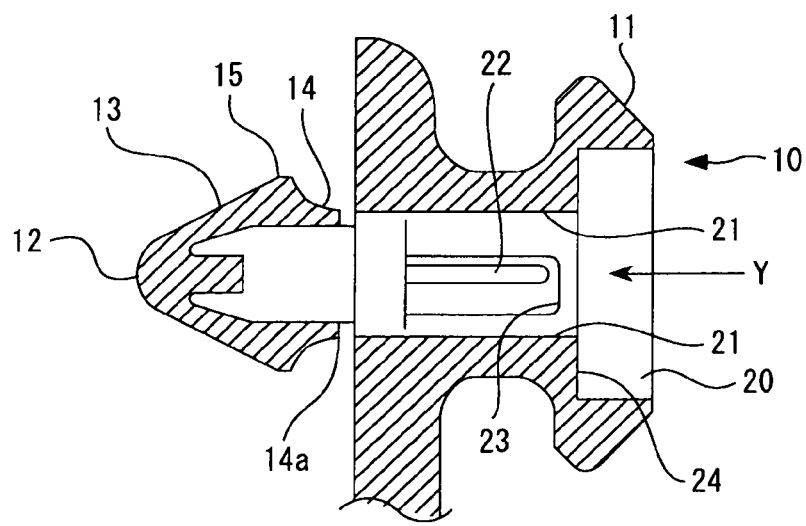
FIGS. 3A to 3C are sectional views illustrating the fastener body, where
Figure 3C:
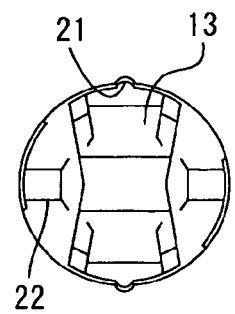
Figure 3B:
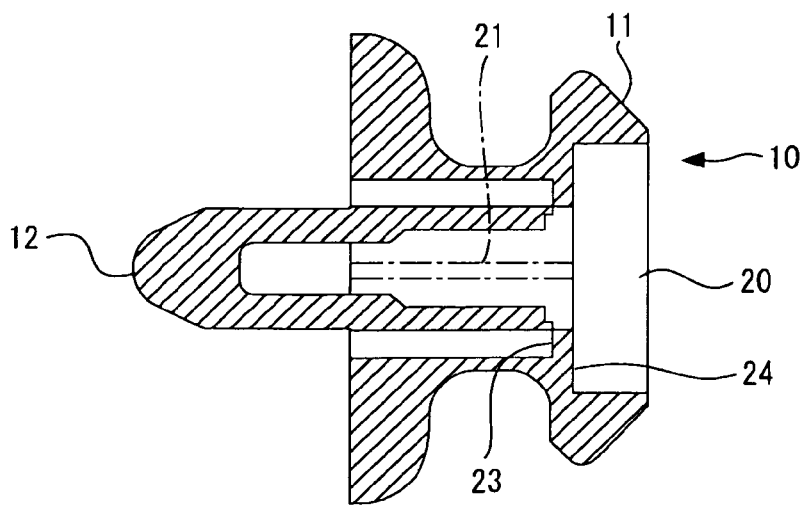

FIGS. 2A to 2C are development views illustrating the fastener body, where FIG. 2A is a side view, FIG. 2B is an enlarged side view of part X of FIG. 2A, and FIG. 2C is an enlarged top view of part X of FIG. 2A. FIGS. 3A to 3C are sectional views illustrating the fastener body, where FIG. 3A is a side view, FIG. 3B is a top view, and FIG. 3C is an enlarged perspective view as viewed in direction Y of FIG. 3A.

As shown in FIGS. 2A to 3C, the fastener body 10 includes a cylindrical portion 11 and a locking portion 12. In the cylindrical portion 11, an insertion hole 20 is formed therethrough to extend in an axis direction thereof. And, the locking portion 12 is formed to outwardly protrude from an end surface of the cylindrical portion 11.

The fastener body 10 is formed in a hook shape, and the cylindrical portion 11 is monolithically formed thereon. The cylindrical portion 11 is formed in a hat shape so as to allow a finger to be easily pinched during attaching and detaching the panel 100. The insertion hole 20 is formed in the axis direction from the top of the cylindrical portion 11.

The locking portion of the fastener body 10 has an elastic claw 13 that is formed to be inserted into an attachment hole 101 of the panel 100. The elastic claw 13 is inserted into one side of the attachment hole 101, exposed from the other side of the attachment hole 101 and locked to an opening edge 101a of the attachment hole 101 at the other side. The insertion hole 20 penetrates the fastener in the axis direction in the back of the locking portion 12. That is, the locking portion 12 and the center line of the insertion hole 20 are coaxial with each other.

From a backward of the elastic claw 13, an extension part 14 is extended. Between the elastic claw 13 and the extension part 14, a connection portion 15 is formed to protrude. The elastic claw 13 and the extension part 14 form a cantilever piece in which a base portion of the elastic claw 13 is connected to the locking portion 12 and a rear end 14a of the extension part 14 is a free end. Accordingly, the elastic claw 13 has an elastic force about the base portion and is locked to the opening edge 101a of the attachment hole 100 through the locking of the connection portion 15 in a normal state. By using an unlocking member 30 to be described later so as to operate on the rear end 14a of the extension part 14, the elastic claw 13 is caused to reduce in the diameter, thereby releasing the locked state.

Figure 4A:
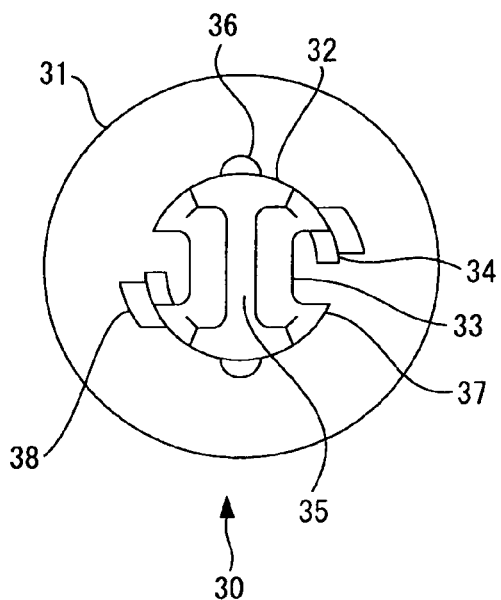
FIGS. 4A to 4E are development views illustrating an unlocking member of the fastener, where
Figure 4B:
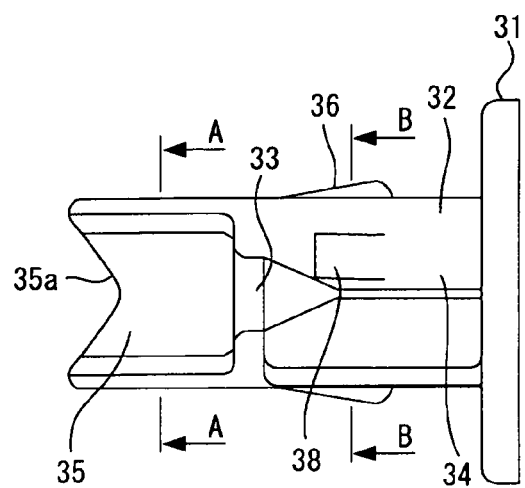
Figure 4C:
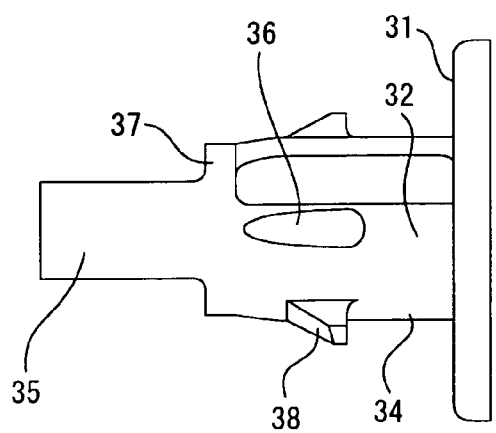
Figure 4D:
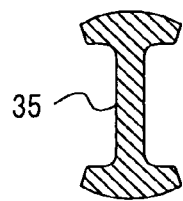
Figure 4E:
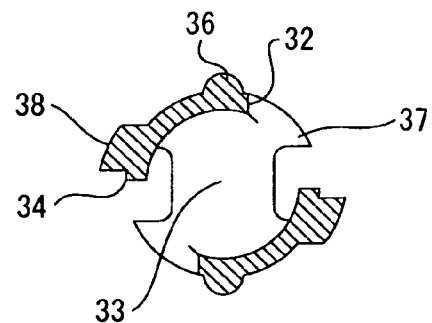

FIGS. 4A to 4E are development views illustrating the unlocking member, where FIG. 4A is a view as viewed from the front side, FIG. 4B is a side view, FIG. 4C is a top view, FIG. 4D is a cross-sectional view taken along line A-A of FIG. 4B, and FIG. 4E is a cross-sectional view taken along line B-B of FIG. 4B.

As shown in FIGS. 1 and 4A to 4E, the unlocking member 30 is inserted into the insertion hole 20 of the fastener body 10. The unlocking member 30 is movable forward and backward in the insertion hole 20 in the back of the elastic claw 13. The unlocking member 30 includes a flange (head portion) 31, a pair of walls 32 extending in the axis direction from the flange 31, and a connection portion 33 connecting the ends of the pair of walls 32.

The flange 31 of the unlocking member 30 is formed in a disc shape. The unlocking member 30 is inserted into the insertion hole 20 up to the flange 31, thereby assembling the fastener. The pair of walls 32 of the unlocking member 30 has an elastic piece 34 in the circumferential direction, and the walls 32 and the elastic pieces 34 form a continuous arc shape. Accordingly, the walls 32 are opposed to each other with a gap interposed therebetween and the core is hollow. A pressing portion 35 having a slope 35a at an end thereof is formed on the connection portion 33 of the unlocking member 30. The pressing portion 35 is disposed at the end of the unlocking member 30 and comes in contact with the rear end 14a of the extension part 14 when inserting the unlocking member 30.

Figure 5A:
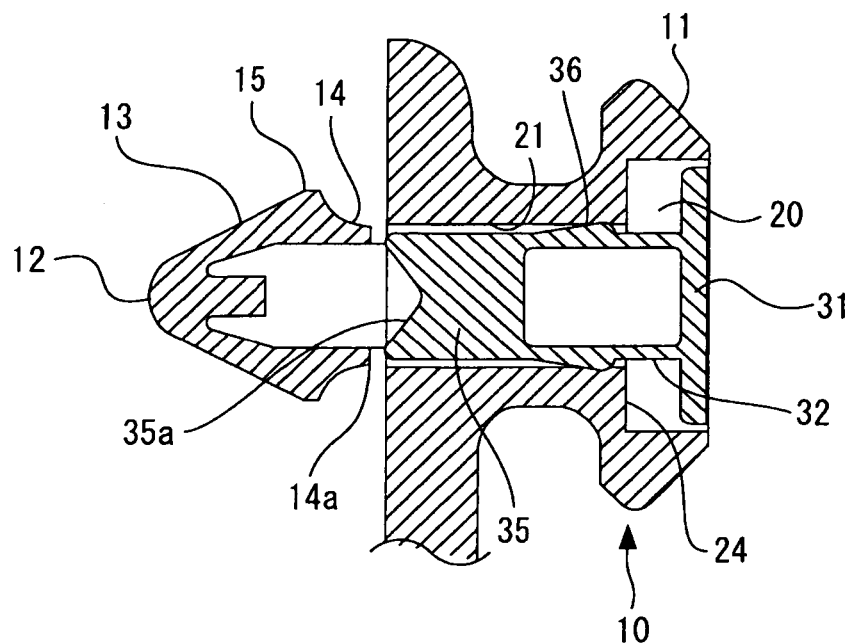
FIGS. 5A to 5B are sectional views illustrating a state where the fastener is assembled, where
Figure 5B:
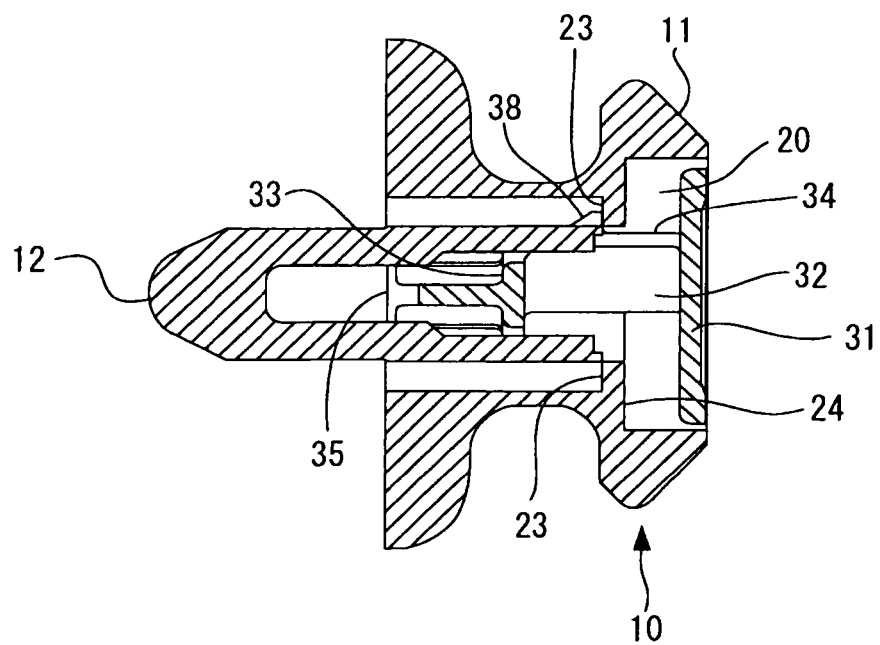

FIGS. 5A to 5B are sectional views illustrating a state where the fastener is assembled, where FIG. 5A is a side view and FIG. 5B is a top view.

The assembly of the fastener is described now. As shown in FIGS. 5A to 5B, the fastener is assembled by inserting the unlocking member 30 into the insertion hole 20 of the fastener body 10. At the time of this assembly, the unlocking member 30 engages with the insertion hole 20 to be positioned and to be prevented from rotation about the axis.

A positioning protrusion 36 protruding in the axis direction is formed on the outer circumferential surface of the walls 32 of the unlocking member 30. On the other hand, a positioning guide groove 21 is formed in the axis direction in the inner circumferential surface of the insertion hole 20 (see FIGS. 3A to 3C). After assembling the fastener, the positioning guide groove 21 engages with the positioning protrusion 36 to slidably guide the positioning protrusion 36. Accordingly, the sliding movement of the unlocking member 30 is permitted only in the forward and backward direction, thereby preventing the deviation in position of the unlocking member 30 due to the circumferential rotation thereof.

A rib 22 extending in the axis direction is formed in the insertion hole 20 of the fastener body 10. On the other hand, in the unlocking member 30, a support portion 37 is formed in the connection portion 33 (see FIGS. 3A to 3C). After assembling the fastener, the unlocking member 30 is movable forward and backward in a state where the rib 22 is interposed between the support portion 37 and the outer edge of the elastic piece 34. At the time of insertion of the unlocking member 30, by inserting the rib 22 between the support portion 37 and the elastic piece 34, the unlocking member 30 is guided to and positioned at a predetermined position. Similarly to the positioning protrusion 36 and the positioning guide groove 21, by that structure, the sliding movement of the unlocking member 30 is restricted in the forward and backward direction, thereby preventing the deviation in a rotational position of the unlocking member 30. Since the deviation in the rotational position is prevented, the fastener can reliably transmit the pressing force of the unlocking member 30 to the elastic claw 13.

A drop-preventing claw 38 is formed in the elastic pieces 34 of the unlocking member 30. A drop-preventing end 23 is formed on the inner circumferential surface of one end of the insertion hole 20.

After assembling the fastener, the drop-preventing claw 38 engages with the drop-preventing end 23 to prevent a drop of the unlocking member 30 from the insertion hole 20. The elastic piece 34 is elastically bent at the time of inserting the unlocking member 30 into the insertion hole 20 to reduce the diameter of the drop-preventing claw 38 inward. Accordingly, the drop-preventing claw 38 does not hinder the insertion of the unlocking member 30.

FIGS. 6A to 6D are side sectional views illustrating a state where the fastener is attached to and detached from the attachment hole.

Figure 6A:
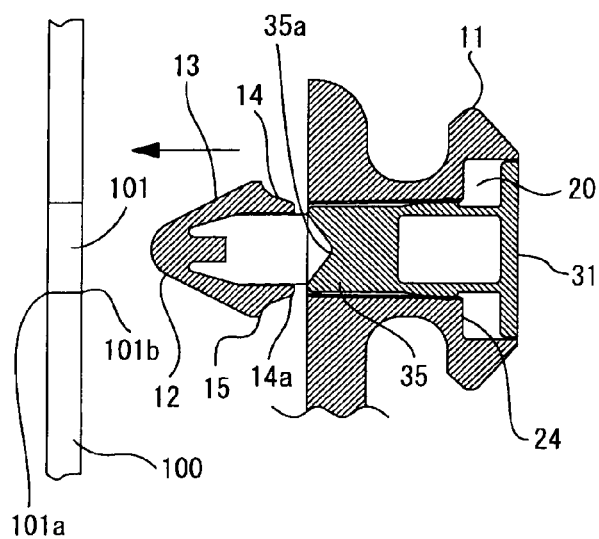
FIGS. 6A to 6D are side sectional views illustrating a state where the fastener is attached to and detached from an attachment hole.

Operational advantages of the fastener according to the embodiment in use are described now with reference to FIGS. 6A to 6D. As shown in FIG. 6A, by inserting the locking portion 12 into the attachment hole 101, the fastener is attached to the panel 100. When attaching the fastener, the elastic claw 13 is reduced in diameter along the opening edge 101b close to the fastener while the elastic claw 13 is inserted into the attachment hole 101, and the connection portion 15 between the elastic claw 13 and the extension part 14 is exposed from the opposite opening edge 101a, whereby the elastic claw 13 having been reduced in diameter is elastically expanded.

Figure 6B:
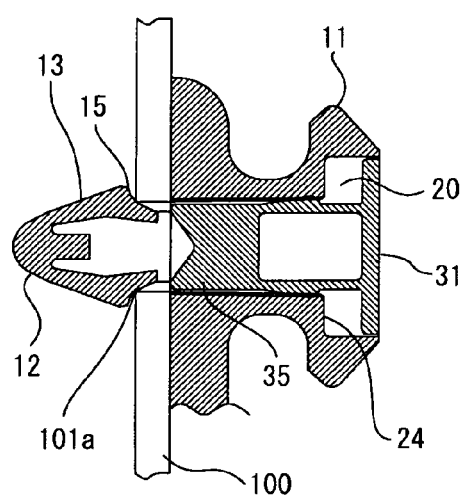

As shown in FIG. 6B, in a state where the fastener is attached to the panel 100, the connection portion 15 between the elastic claw 13 and the extension part 14 is hooked to the opening edge 101b of the attachment hole 101. Accordingly, if the fastener is pulled, the fastener cannot be easily drawn out since the elastic claw 13 is expanded.

On the other hand, since the connection portion 15 is brought into contact with the opening edge 101b of the attachment hole 101, whereby the distance between the pair of extension parts 14 becomes smaller than the width of the pressing portion 35 and thus the extension parts 14 are reliably guided by the slope 35a.

Figure 6C:
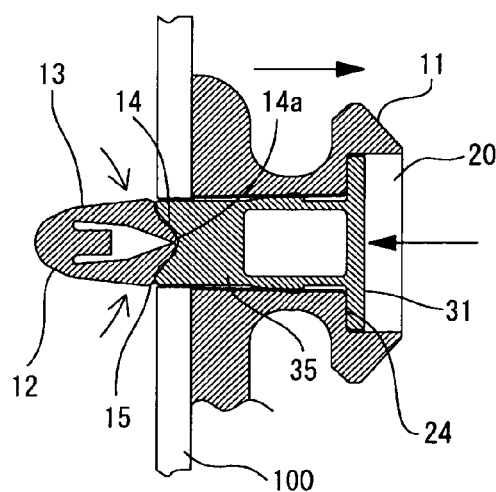

When the fastener is detached from the panel 100, as shown in FIG. 6C, the unlocking member 30 of the fastener is pressed inward. With this pressing operation, the slope 35a of the pressing portion 35 comes in contact with the rear end 14a of the extension part 14 and the rear end 14a is guided to a valley portion of the slope 35a. Through the guidance of the extension part 14 to the valley portion, the elastic claw 13 is shrunk. That is, in the fastener, the elastic claw 13 is reduced in diameter with the external force resulting from the pressing operation of the unlocking member 30 and thus the outer diameter (the connection portion 15) of the locking portion 12 becomes smaller than the diameter of the attachment hole 101. In a state where the unlocking member 30 is pressed to reduce the diameter of the elastic claw 13, the fastener is easily detached from the panel 100 by pulling out the fastener body 10.

A stopper 24 coming in contact with the flange 31 of the unlocking member 30 is formed in the insertion hole 20 of the fastener body 10. The stopper 24 regulates the axial movement of the unlocking member 30 by coming in contact with the flange 31. As a result, the flange 31 and the stopper 24 prevent an excess load from acting on the elastic claw 13 due to the pressing operation of the unlocking member 30, thereby improving the durability of the fastener.

Figure 6D:
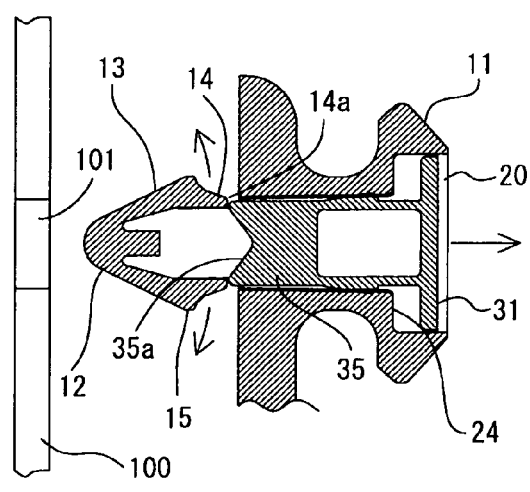

As shown in FIG. 6D, in the fastener, when the forward pressing operation of the unlocking member 30 is released, the elastic claw 13 having been reduced in diameter is elastically expanded. With this expansion, the rear end 14a of the extension part 14 urges the slope 35a of the pressing portion 35 in contact therewith and the unlocking member 30 moves backward by the urging force. Accordingly, the fastener according to the embodiment has an excellent general-use property, because it can be reused without any additional operation.

To detach the fastener according to the embodiment from the panel 100, both operations of forwardly pressing the unlocking member 30 and of backwardly pulling out the fastener body 10 backward are required. That is, the fastener requires the easy operations, but opposite forces to be detached. Accordingly, for example, even when a one-direction impact is applied to the unlocking member 30, the fastener is not simply deviated.

As described above, in the fastener according to the embodiment, since the external force can be transmitted directly to the locking portion 12 by pressing the unlocking member 30, it is possible to reliably unlock the fastener from the attachment hole 101. In the fastener, the unlocking member 30 does not move beyond the locking portion 12. Accordingly, the moving amount of the unlocking member 30 can be reduced, thereby further reducing the size of the fastener. Since only a space corresponding to the protruding width of the locking portion 12 is required for the opposite side of the panel 100 into which the fastener is inserted, it is possible to attach the plate-like member more closely to a vehicle body by the use of the fastener according to the embodiment.

The invention is not limited to the above-mentioned embodiment, but may be embodied in various modified examples or applications.

As another embodiment of the present invention, a spring member may be inserted in advance into the insertion hole 20 of the fastener body 10 and the unlocking member 30 may be always backwardly urged by allowing the spring member to engage with the unlocking member 30. According to such a configuration, it is possible to more reliably restore the unlocking member by allowing the spring member to urge the unlocking member 30 backward than the configuration in which the elastic expansion of the elastic claw 13 is used to move the unlocking member backward.

What is claimed is:

1. A fastener comprising:
   a fastener body that includes:
      a cylindrical portion that includes an insertion hole formed to penetrate therethrough from one end face to the other end face thereof; and
      a locking portion that protrudes outward from the other end face of the cylindrical portion; and
   an unlocking member that is formed to be inserted into the insertion hole,
   wherein the locking portion is formed to be inserted into an attachment hole of an attachment object from a front side, and to be exposed from the attachment hole from a rear side,
   wherein the locking portion includes an elastic claw that is locked to an edge of the attachment hole at the rear side,
   wherein the elastic claw is elastically reducible in diameter,
   wherein the unlocking member is movable in a position rearward of the elastic claw in a direction from the one end face to the other end face of the cylindrical portion,
   wherein the locking portion is reduced in diameter when the unlocking member is pushed,
   wherein the locking portion includes an extension part that is continuously formed with the elastic claw,
   wherein the unlocking member is brought into contact with the extension part when the unlocking member is pushed, and
   wherein the extension part is formed at a distal end of the elastic claw.

2. The fastener according to claim 1,
   wherein the unlocking member includes a pressing portion,
   wherein the pressing portion is brought into contact with the extension part when the unlocking member is pushed, and
   wherein the elastic claw is reduced in diameter through a contact between the pressing portion and the extension part.

3. The fastener according to claim 2,
   wherein the elastic claw pushes back the unlocking member by being released from a diameter-reduced state when a pressing operation onto the unlocking member is released.

4. The fastener according to claim 2,
   wherein the pressing portion is formed at a distal end of the unlocking member.

5. The fastener according to claim 1, wherein the distal end of the elastic claw is disposed on a side of the elastic claw opposite the cylindrical portion.

6. A fastener comprising:
   a fastener body that includes:
      a cylindrical portion that includes an insertion hole formed to penetrate therethrough from one end face to the other end face thereof; and
      a locking portion that protrudes outward from the other end face of the cylindrical portion; and
   an unlocking member that is formed to be inserted into the insertion hole, wherein the locking portion is formed to be inserted into an attachment hole of an attachment object from a front side, and to be exposed from the attachment hole from a rear side, wherein the locking portion includes an elastic claw that is locked to an edge of the attachment hole at the rear side, wherein the elastic claw is elastically reducible in diameter, wherein the unlocking member is movable in a position rearward of the elastic claw in a direction from the one end face to the other end face of the cylindrical portion, wherein the locking portion is reduced in diameter when the unlocking member is pushed, wherein the locking portion includes an extension part that is continuously formed with the elastic claw, wherein the unlocking member includes a pressing portion, wherein the pressing portion is brought into contact with the extension part when the unlocking member is pushed, wherein the elastic claw is reduced in diameter through a contact between the pressing portion and the extension part, wherein the elastic claw and the extension part form a cantilever piece, a root of the elastic claw being a base portion thereof, an end of the extension part being a free end thereof, and wherein the pressing portion includes a slope that is formed to reduce in diameter of the distal end of the extension part when the unlocking member is pushed.

7. A fastener comprising:

a fastener body that includes:
  a cylindrical portion that includes an insertion hole formed to penetrate therethrough from one end face to the other end face thereof; and
  a locking portion that protrudes outward from the other end face of the cylindrical portion; and an unlocking member that is formed to be inserted into the insertion hole, wherein the locking portion is formed to be inserted into an attachment hole of an attachment object from a front side, and to be exposed from the attachment hole from a rear side, wherein the locking portion includes an elastic claw that is locked to an edge of the attachment hole at the rear side, wherein the elastic claw is elastically reducible in diameter, wherein the unlocking member is movable in a position rearward of the elastic claw in a direction from the one end face to the other end face of the cylindrical portion, wherein the locking portion is reduced in diameter when the unlocking member is pushed, wherein the locking portion includes an extension part that is continuously formed with the elastic claw, wherein the unlocking member includes a pressing portion, wherein the pressing portion is brought into contact with the extension part when the unlocking member is pushed, wherein the elastic claw is reduced in diameter through a contact between the pressing portion and the extension part, wherein the unlocking member further includes:
  a head portion;
  a pair of wall portions that extends from the head portion so as to be faced with each other;
  a connection portion that connects ends of the pair of wall portions;
  the pressing portion is formed on the connection portion; and
  a drop-preventing claw that is formed on the pair of wall portions, and wherein, in the insertion hole, a drop-preventing step is formed to be engaged with the drop-preventing claw and to prevent the unlocking member from dropping from the insertion hole.

8. The fastener according to claim 7, wherein the drop-preventing claw includes an elastic piece that protrudes from side edges of the pair of wall portions.

9. The fastener according to claim 8, wherein, on the inner wall of the insertion hole, a rib is formed to extend in an axis direction of the insertion hole, wherein the unlocking member includes a support portion that protrudes from the connection portion, and wherein the support portion and the elastic claw are formed to be slidable in the axis direction with the rib interposed therebetween.

10. The fastener according to claim 7, wherein the unlocking member includes a positioning protrusion that is formed on the pair of wall portions, and wherein, on an inner wall of the insertion hole, a positioning guide groove is formed to slidably guide the positioning protrusion in an axis direction of the insertion hole.

11. The fastener according to claim 7, wherein the head portion includes a flange, and wherein, in the insertion hole, a stopper is formed to regulate a moving range of the unlocking member inside the insertion hole by contacting with the flange.

* * * * *